United States Patent
Mallick et al.

(10) Patent No.: US 10,757,189 B2
(45) Date of Patent: Aug. 25, 2020

(54) SERVICE LEVEL OBJECTION BASED INPUT-OUTPUT SELECTION UTILIZING MULTI-PATH LAYER OF HOST DEVICE

(71) Applicant: EMC IP Holding Company LLC, Hopkinton, MA (US)

(72) Inventors: Sanjib Mallick, Bangalore (IN); Vinay G. Rao, Bangalore (IN); Maneesh Pusalkar, Pune (IN); Arieh Don, Newton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 250 days.

(21) Appl. No.: 15/966,112

(22) Filed: Apr. 30, 2018

(65) Prior Publication Data

US 2019/0334987 A1    Oct. 31, 2019

(51) Int. Cl.
*G06F 15/16* (2006.01)
*H04L 29/08* (2006.01)
(Continued)

(52) U.S. Cl.
CPC .......... *H04L 67/1097* (2013.01); *H04L 41/50* (2013.01); *H04L 43/08* (2013.01)

(58) Field of Classification Search
USPC ........................................ 709/217, 223, 224
See application file for complete search history.

(56) References Cited

U.S. PATENT DOCUMENTS

| 6,567,397 B1 | 5/2003 | Campana et al. |
| 6,687,746 B1 * | 2/2004 | Shuster ............. H04L 29/12066 707/999.005 |

(Continued)

FOREIGN PATENT DOCUMENTS

| CN | 103677927 B | 2/2017 |
| EP | 1117028 A2 | 7/2001 |

(Continued)

OTHER PUBLICATIONS

VMWARE, "Multipathing Configuration for Software iSCSI Using Port Binding," Technical White Paper, Apr. 25, 2012, 15 pages.
(Continued)

*Primary Examiner* — Liang Che A Wang
(74) *Attorney, Agent, or Firm* — Ryan, Mason & Lewis, LLP (57) ABSTRACT

An apparatus in one embodiment comprises a host device that includes a set of input-output (IO) queues and a multi-path input-output (MPIO) driver that selects IO operations from the set of IO queues for delivery to a storage system over a network. The MPIO driver determines service level objectives (SLOs) for respective sources of the IO operations, determines latencies of storage devices of the storage system, assigns an initial time-to-become-urgent (TTBU) value to each of at least a subset of the IO operations based at least in part on the SLO of its source and one or more of the determined latencies, adjusts at least a subset of the TTBU values based at least in part on amounts of time spent by the corresponding IO operations in the set of IO queues, and selects IO operations from the set of IO queues for delivery to the storage system based at least in part on their respective TTBU values as adjusted.

20 Claims, 2 Drawing Sheets

(51) Int. Cl.
*H04L 12/24* (2006.01)
*H04L 12/26* (2006.01)

(56) References Cited

U.S. PATENT DOCUMENTS

| | | | |
|---|---|---|---|
| 6,697,875 B1* | 2/2004 | Wilson | H04L 41/00 707/999.102 |
| 7,275,103 B1 | 9/2007 | Thrasher et al. | |
| 7,454,437 B1* | 11/2008 | Lavallee | H04L 29/12594 |
| 7,617,292 B2 | 11/2009 | Moore et al. | |
| 7,668,981 B1 | 2/2010 | Nagineni et al. | |
| 7,770,053 B1 | 8/2010 | Bappe et al. | |
| 7,809,912 B1 | 10/2010 | Raizen et al. | |
| 7,818,428 B1 | 10/2010 | Lavallee et al. | |
| 7,890,664 B1 | 2/2011 | Tao et al. | |
| 7,904,681 B1 | 3/2011 | Bappe et al. | |
| 7,925,872 B2* | 4/2011 | Lai | H04L 61/1505 709/220 |
| 8,250,256 B2 | 8/2012 | Ghosalkar et al. | |
| 8,285,825 B1 | 10/2012 | Nagaraj et al. | |
| 8,825,919 B1 | 9/2014 | Lim et al. | |
| 8,832,334 B2 | 9/2014 | Okita | |
| 8,874,746 B1 | 10/2014 | Gonzalez | |
| 9,026,694 B1 | 5/2015 | Davidson et al. | |
| 9,201,803 B1 | 12/2015 | Derbeko et al. | |
| 9,400,611 B1 | 7/2016 | Raizen | |
| 9,430,368 B1 | 8/2016 | Derbeko et al. | |
| 9,594,780 B1* | 3/2017 | Esposito | G06F 16/185 |
| 9,647,933 B1 | 5/2017 | Tawri et al. | |
| 9,672,160 B1 | 6/2017 | Derbeko et al. | |
| 9,778,852 B1* | 10/2017 | Marshak | G06F 3/0611 |
| 10,289,325 B1 | 5/2019 | Bono | |
| 10,353,714 B1 | 7/2019 | Gokam et al. | |
| 10,439,878 B1 | 10/2019 | Tah et al. | |
| 10,474,367 B1* | 11/2019 | Mallick | G06F 3/065 |
| 10,476,960 B1 | 11/2019 | Rao et al. | |
| 10,521,369 B1 | 12/2019 | Mallick et al. | |
| 10,606,496 B1 | 3/2020 | Mallick et al. | |
| 10,637,917 B2 | 4/2020 | Mallick et al. | |
| 10,652,206 B1 | 5/2020 | Pusalkar et al. | |
| 2002/0023151 A1 | 2/2002 | Iwatani | |
| 2002/0103923 A1 | 8/2002 | Cherian et al. | |
| 2004/0010563 A1* | 1/2004 | Forte | G06F 3/0607 709/215 |
| 2006/0026346 A1 | 2/2006 | Kadoiri et al. | |
| 2006/0277383 A1 | 12/2006 | Hayden et al. | |
| 2007/0174849 A1 | 7/2007 | Cheung et al. | |
| 2008/0043973 A1* | 2/2008 | Lai | H04L 29/12056 379/218.01 |
| 2008/0201458 A1 | 8/2008 | Salli | |
| 2008/0301332 A1 | 12/2008 | Butler et al. | |
| 2009/0259749 A1 | 10/2009 | Barrett et al. | |
| 2010/0313063 A1 | 12/2010 | Venkataraja et al. | |
| 2011/0197027 A1* | 8/2011 | Balasubramanian | G06F 3/061 711/117 |
| 2011/0296230 A1 | 12/2011 | Chen et al. | |
| 2012/0102369 A1 | 4/2012 | Hiltunen et al. | |
| 2012/0159474 A1* | 6/2012 | Chakhaiyar | G06F 3/0611 718/1 |
| 2012/0246345 A1 | 9/2012 | Contreras et al. | |
| 2013/0117766 A1 | 5/2013 | Bax et al. | |
| 2013/0339551 A1 | 12/2013 | Flanagan et al. | |
| 2014/0105068 A1 | 4/2014 | Xu | |
| 2015/0222705 A1 | 8/2015 | Stephens | |
| 2015/0242134 A1 | 8/2015 | Takada et al. | |
| 2016/0092136 A1 | 3/2016 | Balakrishnan et al. | |
| 2016/0117113 A1 | 4/2016 | Li et al. | |
| 2016/0335003 A1 | 11/2016 | Ahmed et al. | |
| 2017/0235507 A1 | 8/2017 | Sinha et al. | |
| 2018/0189635 A1 | 7/2018 | Olarig et al. | |
| 2018/0253256 A1 | 9/2018 | Bharadwaj | |
| 2018/0317101 A1 | 11/2018 | Koue | |
| 2019/0095299 A1 | 3/2019 | Liu et al. | |
| 2019/0108888 A1 | 4/2019 | Sarkar et al. | |
| 2019/0334987 A1 | 10/2019 | Mallick et al. | |
| 2020/0097203 A1 | 3/2020 | Mallick et al. | |
| 2020/0106698 A1 | 4/2020 | Rao et al. | |
| 2020/0110552 A1 | 4/2020 | Kumar et al. | |
| 2020/0112608 A1 | 4/2020 | Patel et al. | |

FOREIGN PATENT DOCUMENTS

| | | |
|---|---|---|
| EP | 2667569 A1 | 11/2013 |
| WO | PCT/US2019/052549 | 12/2019 |
| WO | PCT/US2019/053204 | 12/2019 |
| WO | PCT/US2019/053473 | 12/2019 |
| WO | PCT/US2019/067144 | 5/2020 |

OTHER PUBLICATIONS

Dell EMC, "Dell EMC SC Series Storage: Microsoft Multipath I/O," Dell EMC Engineering, Jun. 2017, 56 pages.

Dell EMC, "Dell EMC PowerPath Family: PowerPath and PowerPath/VE Multipathing," Data Sheet, 2017, 3 pages.

U.S. Appl. No. 15/795,653 filed in the name of Maneesh Pusalkar et al. dated Oct. 27, 2017 and entitled "Storage System with Network-Wide Configurable Device Names."

U.S. Appl. No. 15/849,828 filed in the name of Sanjib Mallick et al. dated Dec. 21, 2017 and entitled "Storage System with Input-Output Performance Control Utilizing Application Process Detection."

Kris Piepho, "Dell EMC SC Series Storage: Microsoft Multipath I/O," Dell EMC Best Practices, Jan. 2017, 57 pages.

NVM Express, "NVM Express, Revision 1.3," NVM Express, May 1, 2017, 282 pages.

VMware, Inc. "VMware VMFS Volume Management," 2009, 8 pages.

Dell EMC, "Dell EMC Unity: Virtualization Integration," Technical White Paper, Oct. 2019, 39 pages.

Dell EMC, "Dell EMC PowerMax: iSCSI Implementation for Dell EMC Storage Arrays Running PowerMaxOS," Technical White Paper, Sep. 2019, 35 pages.

EMC, "EMC PowerPath and PowerPath/VE Family for Windows," Installation and Administration Guide, Oct. 2018, 102 pages.

EMC, "EMC Powerpath Load Balancing and Failover", Comparison with native MPIO operating system solutions, Feb. 2011, 28 pages.

Dell EMC, "PowerMax OS," Dell EMC PowerMax Family Product Guide, May 2019, 192 pages.

Dell EMC, "Dell EMC SC Series Storage and Microsoft Multipath I/O," CML 1004, Jul. 2018, 36 pages.

U.S. Appl. No. 16/697,393 filed in the name of Vinay G. Rao et al. dated Nov. 27, 2019, and entitled "Automated Seamless Migration of Logical Storage Devices."

U.S. Appl. No. 16/710,828 filed in the name of Amit Pundalik Anchi et al. dated Dec. 11, 2019, and entitled "Automated Seamless Migration with Signature Issue Resolution."

* cited by examiner

FIG. 1

SERVICE LEVEL OBJECTION BASED INPUT-OUTPUT SELECTION UTILIZING MULTI-PATH LAYER OF HOST DEVICE

FIELD

The field relates generally to information processing systems, and more particularly to storage in information processing systems.

BACKGROUND

A wide variety of different types of storage systems are known. For example, some storage systems are configured to include multiple storage tiers, with different ones of the tiers providing different levels of performance or other characteristics. In such storage systems, data may be moved from one tier to another within a given storage system based on access frequency of the data or other factors. These and other types of tiered or non-tiered storage systems may be shared by multiple host devices of a compute cluster. However, problems can arise in such arrangements when a storage array or other type of storage system attempts to provide different service level objectives (SLOs) for processing of different types of input-output (IO) operations from the host devices that share that storage system. For example, in some implementations there may be hundreds of different host devices which share the same storage system, making it very difficult for the storage system to achieve the desired SLOs for the IO operations of all of its associated host devices. This is due at least in part to the utilization of artificial delays in storage system queues. Such delays are intended to increase certain response times in order to meet the particular requirements specified by lower-performance SLOs. These actions can increase queue congestion within the storage system, resulting in one or more of the host devices receiving excessive "queue full" messages from the storage system.

SUMMARY

Illustrative embodiments of the present invention provide SLO-based IO selection utilizing a multi-path layer of one or more host devices, operating in cooperation with a shared storage array or other type of storage system. The multi-path layer illustratively comprises at least one multi-path input-output (MPIO) driver configured to process IO operations for delivery from a corresponding host device to the storage system. These and other embodiments overcome the problems that can otherwise result when storage systems alone attempt to achieve SLOs across multiple host devices that share that storage system. For example, configuring an MPIO driver of a host device to interact with a storage array or other storage system in implementing SLOs can avoid or otherwise limit the situations in which the above-noted artificial delays are introduced in storage system queues, thereby reducing storage system queue congestion. As a result, the number of "queue full" messages received in the host devices from the storage system is reduced, and overall storage system performance is improved.

In one embodiment, an apparatus comprises a host device configured to communicate over a network with a storage system. The host device includes a set of IO queues and an MPIO driver configured to select IO operations from the set of IO queues for delivery to the storage system over the network. The MPIO driver is further configured to determine SLOs for respective sources of the IO operations, to determine latencies of storage devices of the storage system, to assign an initial time-to-become-urgent (TTBU) value to each of at least a subset of the IO operations based at least in part on the SLO of its source and one or more of the determined latencies, to adjust at least a subset of the TTBU values based at least in part on amounts of time spent by the corresponding IO operations in the set of IO queues, and to select IO operations from the set of IO queues for delivery to the storage system based at least in part on their respective TTBU values as adjusted.

The MPIO driver of the host device interacts with the storage system in implementing the above-described SLO-based IO selection. For example, the MPIO driver illustratively determines the SLOs for respective processes or other sources of the IO operations based at least in part on corresponding SLO information read by the MPIO driver from the storage system. Also, the MPIO driver in determining latencies of the storage devices illustratively determines a current latency for a given one of the storage devices based at least in part on an average response time of the given storage device to IO operations delivered to the given storage device over a designated period of time.

These and other illustrative embodiments include, without limitation, apparatus, systems, methods and computer program products comprising processor-readable storage media.

DETAILED DESCRIPTION

Illustrative embodiments will be described herein with reference to exemplary information processing systems and associated computers, servers, storage devices and other processing devices. It is to be appreciated, however, that embodiments of the present disclosure are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center that includes one or more clouds hosting multiple tenants that share cloud resources. Numerous other types of enterprise and cloud-based computing and storage systems are also encompassed by the term "information processing system" as that term is broadly used herein.

Figure 1:
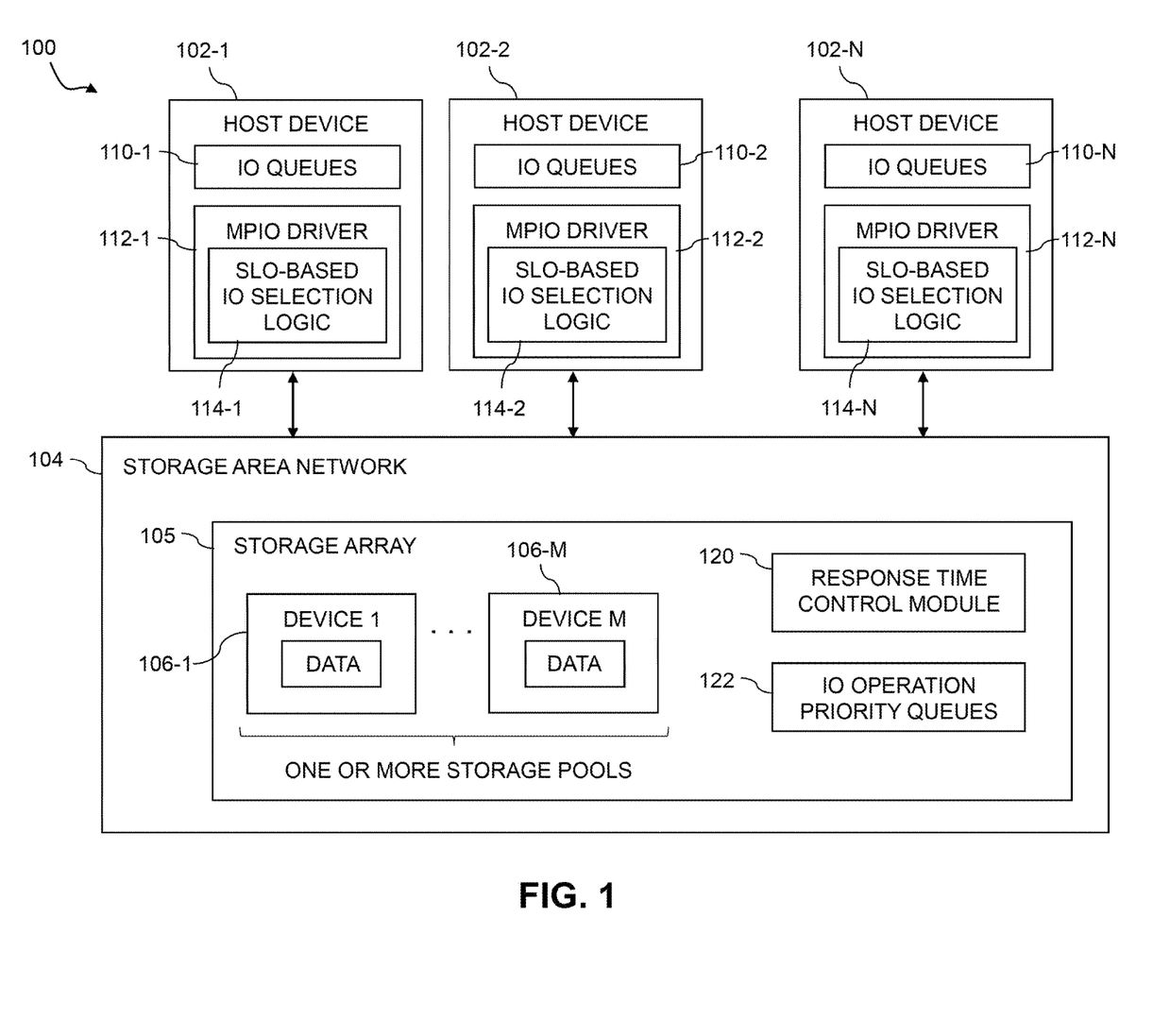
FIG. 1 is a block diagram of an information processing system configured with functionality for SLO-based IO selection utilizing a multi-path layer of a host device in an illustrative embodiment.

FIG. 1 shows an information processing system 100 configured in accordance with an illustrative embodiment. The information processing system 100 comprises a plurality of host devices 102-1, 102-2, . . . 102-N. The host devices 102 communicate over a storage area network (SAN) 104 with at least one storage array 105. The storage array 105 comprises a plurality of storage devices 106-1, . . . 106-M each storing data utilized by one or more applications running on one or more of the host devices 102. The storage devices 106 are illustratively arranged in one or more storage pools. The storage array 105 and its associated storage devices 106 are an example of what is more generally referred to herein as a "storage system." This storage system in the present embodiment is shared by the host devices 102, and is therefore also referred to herein as a "shared storage system."

The host devices 102 illustratively comprise respective computers, servers or other types of processing devices capable of communicating with the storage array 105 of the SAN 104. For example, at least a subset of the host devices 102 may be implemented as respective virtual machines of a compute services platform or other type of processing platform. The host devices 102 in such an arrangement illustratively provide compute services such as execution of one or more applications on behalf of each of one or more users associated with respective ones of the host devices 102. The term "user" herein is intended to be broadly construed so as to encompass numerous arrangements of human, hardware, software or firmware entities, as well as combinations of such entities. Compute services may be provided for users under a platform-as-a-service (PaaS) model, although it is to be appreciated that numerous other cloud infrastructure arrangements could be used.

The storage devices 106 of the storage array 105 of SAN 104 implement logical units (LUNs) configured to store objects for users associated with the host devices 102. These objects can comprise files, blocks or other types of objects. The host devices 102 interact with the storage array 105 utilizing read and write commands as well as other types of commands that are transmitted over the SAN 104. Such commands in some embodiments more particularly comprise Small Computer System Interface (SCSI) commands, although other types of commands can be used in other embodiments. A given IO operation as that term is broadly used herein illustratively comprises one or more such commands. References herein to terms such as "input-output" and "IO" should be understood to refer to input and/or output. Thus, an IO operation relates to at least one of input and output.

Also, the term "storage device" as used herein is intended to be broadly construed, so as to encompass, for example, a logical storage device such as a LUN. A logical storage device can be defined in the storage array 105 to include different portions of one or more physical storage devices. Storage devices 106 may therefore be viewed as comprising respective LUNs or other logical storage devices.

Each of the host devices 102 may have multiple paths to the storage array 105, with at least one of the storage devices 106 of the storage array 105 being visible to that host device on a given one of the paths. A given one of the storage devices 106 may be accessible to the given host device over multiple paths.

Different ones of the storage devices 106 of the storage array 105 illustratively exhibit different latencies in processing of IO operations. In some cases, the same storage device may exhibit different latencies for different ones of multiple paths over which that storage device can be accessed from a given one of the host devices 102.

The host devices 102, SAN 104 and storage array 105 in the FIG. 1 embodiment are assumed to be implemented using at least one processing platform each comprising one or more processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The host devices 102 and the storage array 105 may be implemented on respective distinct processing platforms, although numerous other arrangements are possible. For example, in some embodiments at least portions of the host devices 102 and the storage array 105 are implemented on the same processing platform. The storage array 105 can therefore be implemented at least in part within at least one processing platform that implements at least a subset of the host devices 102.

The SAN 104 may be implemented using multiple networks of different types to interconnect storage system components. For example, the SAN 104 may comprise a portion of a global computer network such as the Internet, although other types of networks can be part of the SAN 104, including a wide area network (WAN), a local area network (LAN), a satellite network, a telephone or cable network, a cellular network, a wireless network such as a WiFi or WiMAX network, or various portions or combinations of these and other types of networks. The SAN 104 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The host devices 102 comprise respective sets of IO queues 110-1, 110-2, . . . 110-N and respective MPIO drivers 112-1, 112-2, . . . 112-N. The MPIO drivers 112 collectively comprise a multi-path layer of the host devices 102. The multi-path layer provides functionality for SLO-based IO selection using respective instances of SLO-based IO selection logic 114-1, 114-2, . . . 114-N implemented within the MPIO drivers 112.

The MPIO driver 112-1 is configured to select IO operations from its corresponding set of IO queues 110-1 for delivery to the storage array 105 over the SAN 104. The MPIO driver 112-1 is further configured to determine SLOs for respective sources of the IO operations, to determine latencies of the storage devices 106 of the storage array 105, and to assign an initial TTBU value to each of at least a subset of the IO operations based at least in part on the SLO of its source and one or more of the determined latencies. The MPIO driver 112-1 also adjusts at least a subset of the TTBU values based at least in part on amounts of time spent by the corresponding IO operations in the set of IO queues 110-1, and selects IO operations from the set of IO queues 110-1 for delivery to the storage array 105 based at least in part on their respective TTBU values as adjusted.

These and other functions of the MPIO driver 112-1 are carried out at least in part under the control of its SLO-based IO selection logic 114-1. For example, the SLO-based IO selection logic 114-1 is illustratively configured to control performance of the steps of the flow diagram to be described below in conjunction with FIG. 2.

It is assumed that each of the other MPIO drivers 112 is configured in a manner similar to that described above and elsewhere herein for the first MPIO driver 112-1. The other host devices 102 of the system 100 are therefore also configured to communicate over the SAN 104 with the storage array 105 and the MPIO drivers 112 of such other host devices are each similarly configured to select IO operations from its corresponding one of the sets of IO queues 110 for delivery to the storage array 105 over the SAN 104.

The MPIO drivers 112 may comprise otherwise conventional MPIO drivers, such as PowerPath drivers from Dell EMC, suitably modified in the manner disclosed herein to perform SLO-based IO selection utilizing SLO information read from a storage system such as storage array 105.

The sources of the IO operations stored in the sets of IO queues 110 illustratively include respective processes of one or more applications executing on the one or more of the host devices 102. Other types of sources of IO operations may be present in a given implementation of system 100.

In some embodiments, the MPIO driver 112-1 of the host device 102-1 is configured to determine the SLOs for respective sources of the IO operations based at least in part on corresponding SLO information read by the MPIO driver 112-1 from the storage array 105 via the SAN 104. For example, the SLO information may be stored in a persistent memory of the storage array 105, and read from the persistent memory utilizing one or more commands generated in the host device 102-1.

The persistent memory may comprise a flash memory or other type of non-volatile memory of the storage array 105. More particular examples include NAND-based flash memory or other types of non-volatile memory such as resistive RAM, phase change memory, spin torque transfer magneto-resistive RAM (STT-MRAM) and Intel Optane™ devices based on 3D XPoint™ memory. The persistent memory is assumed to be separate from the storage devices 106 of the storage array 105, although in other embodiments the persistent memory may be implemented as a designated portion or portions of one or more of the storage devices 106. For example, in some embodiments the storage devices 106 may comprise flash-based storage devices, as in embodiments involving all-flash storage arrays.

The above-noted commands utilized by the MPIO driver 112-1 to read SLO information from the storage array 105 can include commands that are part of a standard command set or may include custom commands such as a "vendor unique command" or VU command that is not part of a standard command set.

These and other commands used by the host devices 102 to communicate with the storage array 105 illustratively comprise SCSI commands, although as noted above other types of commands and command formats can be used in other embodiments. For example, some embodiments can implement IO operations utilizing command features and functionality associated with NVM Express (NVMe), as described in the NVMe Specification, Revision 1.3, May 2017, which is incorporated by reference herein.

The MPIO driver 112-1 of the host device 102-1 in determining latencies of the storage devices 106 is illustratively configured to determine a current latency for a given one of the storage devices 106 based at least in part on an average response time of the given storage device to IO operations delivered to the given storage device over a designated period of time. Similar determinations are made for other ones of the storage devices 106. Also, in some embodiments, latencies may be determined on a per-path basis for each of one or more of the storage devices 106 that are accessible via multiple paths.

The MPIO driver 112-1 may be configured to compute initial TTBU values for assignment to respective ones of the IO operations by decrementing an average response time of a corresponding one of the storage devices 106 from an expected response time of an SLO of the source of each IO operation to obtain as the TTBU value for that IO operation an amount of time that the IO operation can remain in the set of IO queues 110-1 without adversely impacting its expected response time.

The MPIO driver 112-1 may be configured to adjust at least a subset of the TTBU values based at least in part on amounts of time spent by the corresponding IO operations in the set of IO queues by periodically decrementing each of the TTBU values in accordance with an elapsed time spent by that IO operation in the set of IO queues since assignment of its initial TTBU value.

In some embodiments, the MPIO driver 112-1 is configured to select IO operations from the set of IO queues 110-1 for delivery to the storage array 105 in order of increasing TTBU values such that IO operations having smaller TTBU values are selected before other IO operations having larger TTBU values. The MPIO driver 112-1 may assign initial TTBU values of zero to respective ones of the IO operations having a highest priority level so as to ensure that any such TO operations are selected for delivery to the storage array 105 prior to other IO operations having non-zero TTBU values.

Additionally or alternatively, the MPIO driver 112-1 may be configured to hold in the set of IO queues 110-1 any IO operations having TTBU values that are greater than a threshold multiple of an average response time of a corresponding one of the storage devices 106. By way of example, the threshold multiple is about 1.5 times the average response time of the corresponding one of the storage devices 106.

A wide variety of other types of TTBU values and associated IO operation selection mechanisms may be used. For example, in other embodiments, the TTBU values may be inverted for use in the selection process, such that the MPIO driver 112-1 is configured to select TO operations from the set of IO queues 110-1 for delivery to the storage array 105 in order of decreasing inverted TTBU values. The term "TTBU value" as used herein is intended to be broadly construed so as to encompass results of such inversions or one or more other functions of values that are assignable to respective IO operations and that provide a relative indication of selection priority within the system 100. The term is not intended to incorporate any particular measure of processing urgency, but should instead be more generally construed as encompassing values of various types that are each indicative of an amount of time that a given IO operation can be queued in a host device while ensuring a relatively low probability of violating an expected response time.

As indicated previously, the sources of the IO operations stored in the sets of IO queues 110 illustratively include respective processes of one or more applications executing on the one or more of the host devices 102. The assignment of initial TTBU values to respective ones of the TO operations can be based at least in part on the types of processes from which those IO operations originate.

For example, in embodiments in which the processes comprise respective synchronous and asynchronous processes of an application running on the host device 102-1, the IO operations generated by the synchronous process of the application may be assigned lower initial TTBU values by the MPIO driver 112-1 than IO operations generated by the asynchronous process of the application.

As another example, in embodiments in which the processes comprise respective log and database processes of a database application running on the host device 102-1, the IO operations generated by the log process of the database application may be assigned lower initial TTBU values by the MPIO driver 112-1 than IO operations generated by the database process of the database application.

Other process types or additional or alternative factors may be taken into account in the IO operation selection process performed by the MPIO driver 112-1. For example, the MPIO driver 112-1 may be configured to select one of a plurality of available paths for delivery of selected IO operations to a given one of the storage devices 106 of the storage array 105 based at least in part on average response times of respective ones of the multiple paths to the given storage device and the TTBU values.

Again, functionality described above in the context of the first MPIO driver 112-1 may be similarly performed by each of the other MPIO drivers 112-2 through 112-N.

The MPIO drivers 112 may be otherwise configured utilizing well-known MPIO functionality such as that described in K. Piepho, "Dell EMC SC Series Storage: Microsoft Multipath I/O," Dell EMC Engineering, June 2017, which is incorporated by reference herein. Such conventional MPIO functionality is suitably modified in illustrative embodiments disclosed herein to support performance of SLO-based IO selection utilizing SLO information read from the storage array 105.

The storage array 105 in the present embodiment comprises additional components such as response time control module 120 and IO operation priority queues 122. The response time control module 120 may be used to implement storage array based adjustments in response time for particular IO operations based at least in part on the SLO information stored by the storage array 105 in its persistent memory. The response time control module 120 operates in conjunction with the IO operation priority queues 122.

As indicated previously, absent use of the SLO-based IO selection techniques in an MPIO layer disclosed herein, it can be difficult for a storage system such as storage array 105 to achieve different SLOs for IO operations from all of the potentially large number of host devices that share that storage array. This may be due at least in part to the utilization of artificial delays in IO operation priority queues 122. Such delays are intended to increase certain response times in order to meet the particular requirements specified by lower-performance SLOs. These actions can increase queue congestion within the storage array 105, resulting in one or more of the host devices 102 receiving excessive "queue full" messages from the storage array 105. Such drawbacks are advantageously overcome in illustrative embodiments herein by utilization of an MPIO layer comprising one or more of the MPIO drivers 112 to perform SLO-based IO selection from the sets of IO queues 110 of the host devices 102.

The storage array 105 utilizes its IO operation priority queues 122 to provide different levels of performance for IO operations. For example, the IO operation priority queues 122 may have respective different priority levels. The storage array 105 may be configured to provide different priority levels for different ones of the IO operations by assigning different ones of the IO operations to different ones of the IO operation priority queues 122. The IO operation priority queues 122 are illustratively associated with respective SLOs for processing of IO operations in the storage array 105. The SLO information read from the storage array 105 by the MPIO driver 112 for use by their respective instances of the SLO-based IO selection logic 114 illustratively characterizes the respective SLOs utilized by the IO operation priority queues, although utilizing such information to perform SLO-based IO selection in the MPIO layer provides significant advantages.

As mentioned above, communications between the host devices 102 and the storage array 105 may utilize PCIe connections or other types of connections implemented over one or more networks. For example, illustrative embodiments can use interfaces such as Serial Attached SCSI (SAS) and Serial ATA (SATA). Numerous other interfaces and associated communication protocols can be used in other embodiments.

The storage array 105 in some embodiments may be implemented as part of cloud infrastructure in the form of a cloud-based system such as an Amazon Web Services (AWS) system. Other examples of cloud-based systems that can be used to provide at least portions of the storage array 105 and possibly other portions of system 100 include Google Cloud Platform (GCP) and Microsoft Azure.

The storage array 105 may additionally or alternatively be configured to implement multiple distinct storage tiers of a multi-tier storage system. By way of example, a given multi-tier storage system may comprise a fast tier or performance tier implemented using flash storage devices, and a capacity tier implemented using hard disk drive devices. A wide variety of other types of server-based flash storage devices and multi-tier storage systems can be used in other embodiments, as will be apparent to those skilled in the art. The particular storage devices used in a given storage tier may be varied depending on the particular needs of a given embodiment, and multiple distinct storage device types may be used within a single storage tier. As indicated previously, the term "storage device" as used herein is intended to be broadly construed, and so may encompass, for example, disk drives, flash drives, solid-state drives, hybrid drives or other types of storage products and devices, or portions thereof, and illustratively include logical storage devices such as LUNs.

As another example, the storage array 105 may be used to implement one or more storage nodes in a cluster storage system comprising a plurality of storage nodes interconnected by one or more networks.

It should therefore be apparent that the term "storage array" as used herein is intended to be broadly construed, and may encompass multiple distinct instances of a commercially-available storage array suitably reconfigured to interact with host devices to support SLO-based IO selection in an MPIO layer as disclosed herein.

For example, the storage array 105 may comprise one or more storage arrays such as VNX®, Symmetrix VMAX® and Unity™ storage arrays, commercially available from Dell EMC. Other types of storage products that can be used in implementing a given storage system in illustrative embodiments include software-defined storage products such as ScaleIO™, cloud storage products such as Elastic Cloud Storage (ECS), object-based storage products such as Atmos, scale-out all-flash storage arrays such as XtremIO™, and scale-out NAS clusters comprising Isilon® platform nodes and associated accelerators, all from Dell EMC. Combinations of multiple ones of these and other storage products can also be used in implementing a given storage system in an illustrative embodiment.

These and other storage systems can be part of what is more generally referred to herein as a processing platform comprising one or more processing devices each comprising a processor coupled to a memory. A given such processing device may correspond to one or more virtual machines or other types of virtualization infrastructure such as Docker containers or other types of LXCs. As indicated above, communications between such elements of system 100 may take place over one or more networks.

The term "processing platform" as used herein is intended to be broadly construed so as to encompass, by way of illustration and without limitation, multiple sets of processing devices and associated storage systems that are configured to communicate over one or more networks. For example, distributed implementations of the host devices 102 are possible, in which certain ones of the host devices 102 reside in one data center in a first geographic location while other ones of the host devices 102 reside in one or more other data centers in one or more other geographic locations that are potentially remote from the first geographic location. Thus, it is possible in some implementations of the system 100 for different ones of the host devices 102 to reside in different data centers than the storage array 105.

Numerous other distributed implementations of the host devices 102 and/or the storage array 105 are possible. Accordingly, the storage array 105 can also be implemented in a distributed manner across multiple data centers.

It is to be appreciated that these and other features of illustrative embodiments are presented by way of example only, and should not be construed as limiting in any way. Accordingly, different numbers, types and arrangements of system components such as host devices 102, SAN 104, storage array 105, storage devices 106, sets of IO queues 110, MPIO drivers 112 and instances of SLO-based IO selection logic 114 can be used in other embodiments.

It should also be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

The operation of the information processing system 100 will now be described in further detail with reference to the flow diagram of the illustrative embodiment of FIG. 2. The process as shown includes steps 200 through 212, and is suitable for use in the system 100 but is more generally applicable to other types of systems comprising multiple host devices and a shared storage system. The shared storage system in this embodiment is assumed to comprise at least one storage array having a plurality of storage devices.

Figure 2:
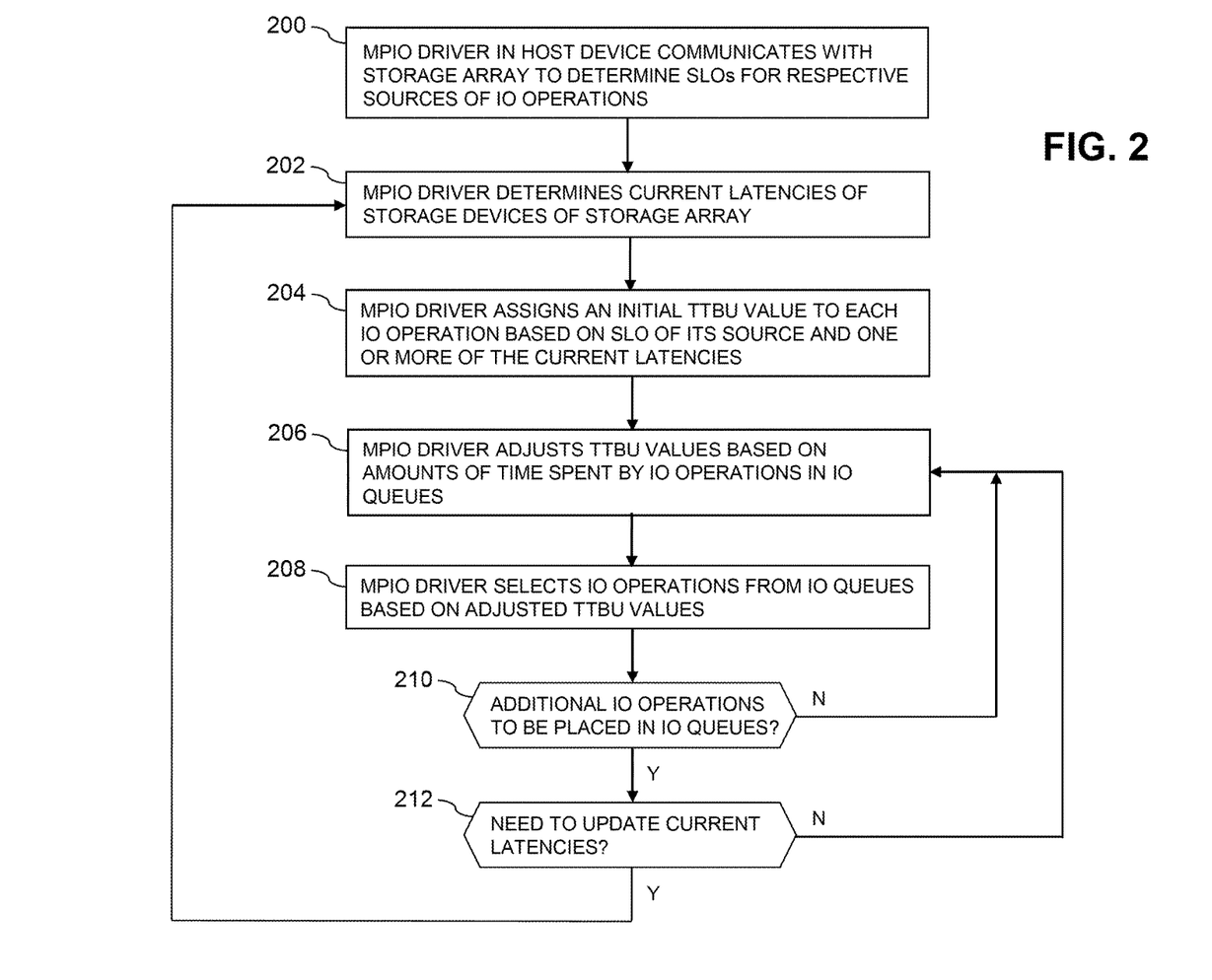
FIG. 2 is a flow diagram of a process for SLO-based IO selection utilizing a multi-path layer of a host device in an illustrative embodiment.

The steps of the FIG. 2 process are illustratively performed primarily by or under the control of an MPIO driver of a given host device, although other arrangements of system components can perform at least portions of one or more of the steps in other embodiments. This embodiment further assumes that the commands utilized by the host devices in generating IO operations such as read and write operations directed to the storage array comprise SCSI commands, although other types of commands can be used.

In step 200, an MPIO driver of a given host device communicates with a storage array to determine SLOs for respective sources of IO operations. Such communications can include sense commands or other types of commands directed from the given host device to the storage array by the MPIO driver. As indicated previously, the commands in this embodiment illustratively comprise respective SCSI commands, possibly in the form of VU commands or other user-defined commands, although numerous other SCSI or non-SCSI command formats may be used in other embodiments.

The sources of the IO operations illustratively include respective processes of one or more applications executing on the host device, with different processes having different SLOs. For example, in some embodiments the processes comprise respective synchronous and asynchronous processes of an application, with the synchronous process having a higher-performance SLO than the asynchronous process. As another example, the processes may comprise respective log and database processes of a database application, with the log process having a higher-performance SLO than the database process.

The MPIO driver of the host device may determine the SLOs for respective sources of the 10 operations based at least in part on corresponding SLO information read by the MPIO driver from a persistent memory of the storage array using the above-noted SCSI commands.

In step 202, the MPIO driver determines current latencies of storage devices of the storage array. For example, the MPIO driver may determine a current latency for a given one of the storage devices of the storage array based at least in part on an average response time of the given storage device to IO operations delivered to the given storage device over a designated period of time. In some embodiments, the MPIO driver determines current latencies on a per-path basis for each of a plurality of paths of a given storage device where the given storage device is accessible over multiple paths. Thus, the determination of current latencies in some embodiments involves determining multiple current latencies for respective paths for each of a plurality of storage devices.

In step 204, the MPIO driver assigns an initial TTBU value to each IO operation based on the SLO of its source and one or more of the current latencies. For example, the MPIO driver may compute initial TTBU values for assignment to respective ones of the IO operations by decrementing an average response time of a corresponding one of the storage devices from an expected response time of an SLO of the source of each IO operation to obtain as the TTBU value for that IO operation an amount of time that the IO operation can remain in the set of IO queues without adversely impacting its expected response time.

One or more additional or alternative factors may be taken into account in assigning an initial TTBU value to a given IO operation from a particular source. This step of the FIG. 2 process illustratively results in different initial TTBU values being assigned to different ones of the IO operations that originate from different sources.

For example, if the processes comprise respective synchronous and asynchronous processes of an application, the IO operations generated by the synchronous process of the application are assigned lower initial TTBU values by the MPIO driver than IO operations generated by the asynchronous process of the application.

As another example, if the processes comprise respective log and database processes of a database application, the IO operations generated by the log process of the database application are assigned lower initial TTBU values by the MPIO driver than IO operations generated by the database process of the database application.

In step 206, the MPIO driver adjusts the TTBU values based on amounts of time spent by the corresponding IO operations in the IO queues of the host device. For example, the MPIO driver may adjust at least a subset of the TTBU values by periodically decrementing each of the TTBU values in accordance with an elapsed time spent by that IO operation in the set of IO queues since assignment of its initial TTBU value.

As in the previous step, additional or alternative factors may be taken into account in adjusting the TTBU values of the respective IO operations at this step.

In step 208, the MPIO driver selects IO operations from the IO queues based on the adjusted TTBU values. For example, the MPIO driver may select IO operations from the set of IO queues for delivery to the storage array in order of increasing TTBU values, such that IO operations having smaller TTBU values are selected before other IO operations having larger TTBU values.

Numerous additional or alternative arrangements are possible. For example, the MPIO driver may assign initial TTBU values of zero to respective ones of the IO operations having a highest priority level so as to ensure that any such IO operations are selected for delivery to the storage array prior to other IO operations having non-zero TTBU values.

As another example, the MPIO driver may hold in the set of IO queues any IO operations having TTBU values that are greater than a threshold multiple of an average response time of a corresponding one of the storage devices. The threshold multiple may be about 1.5 times the average response time of the corresponding one of the storage devices, although other multiples may be used.

Other factors can also be taken into account in the selection of IO operations in step 208, as in the two previous steps 204 and 206. For example, in some embodiments, the MPIO driver may select one of a plurality of available paths for delivery of selected IO operations to a given one of the storage devices based at least in part on average response times of respective ones of the paths to the given storage device and the TTBU values.

In step 210, a determination is made as to whether or not there are additional IO operations to be placed in the IO queues. If there are no such additional IO operations to be placed in the IO queues, the process returns to step 206, and otherwise moves to step 212.

In step 212, a determination is made as to whether or not there is a need to update one or more of the current latencies. If there is no need to update any of the current latencies, the process returns to step 206, and otherwise returns to step 202 to update one or more of the current latencies as needed. After updating the current latencies in step 202, the process continues with step 204 as previously described, with initial TTBU values being assigned based on SLO and updated current latencies. The term "initial" in this context and others herein is therefore intended to be broadly construed, so as to encompass, for example, a first assignment of a TTBU value to an IO operation using an updated determination of the current latency of a corresponding one of the storage devices of the storage array.

Although not expressly shown in the flow diagram, following an affirmative determination in step 210 that there are additional IO operations to be placed in the IO queues, those additional IO operations are assumed to be placed in the IO queues. The additional IO operations will be assigned initial TTBU values after the process returns to step 204 via steps 212 and 202 to update the current latencies.

Multiple additional instances of the FIG. 2 process are assumed to be performed in respective additional host devices that share the storage array.

The particular processing operations and other system functionality described in conjunction with the flow diagram of FIG. 2 are presented by way of illustrative example only, and should not be construed as limiting the scope of the disclosure in any way. Alternative embodiments can use other types of processing operations involving host devices, storage systems and SLO-based IO selection functionality. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different SLO-based IO selection arrangements within a given information processing system.

Functionality such as that described in conjunction with the flow diagram of FIG. 2 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

An additional example of an illustrative embodiment implemented using the FIG. 2 process for performing SLO-based IO selection will now be described.

In this embodiment, it is assumed that the storage array implements IO response time based SLOs at least in part through the introduction of artificial delays for lower-performance SLOs, either by queuing the corresponding IO operations for longer than necessary or delaying the reporting of status on those IO operations back to the host device, both of which can lead to performance issues as previously described.

Such drawbacks are overcome in the present embodiment through utilization of an MPIO layer of one or more host devices to implement SLO-based IO selection from host device queues. A given host device will generally include a larger IO queue for a given defined logical storage device than that provided by the storage array itself and therefore queuing IO operations in the host device will have less of an impact on overall system performance than queuing in the storage array.

The MPIO driver of a given host device of the system implements SLO-based IO selection in cooperation with the storage array using the following process, which is assumed to be implemented under the control of corresponding SLO-based IO selection logic implemented in the MPIO driver:

1. Read the SLO assigned to each defined logical storage device from the storage array.

2. Determine the current latencies of the storage devices by measuring the average response time of each storage device for a particular time period (e.g., the last IO seconds). The latencies of the storage devices are thus illustratively determined on a per-device basis, and may additionally be determined for each of multiple paths over which a given storage device is accessible by the host device. The latency for a given IO operation may be defined as the elapsed time from when the IO operation leaves the host device until the host device receives a status response for that IO operation from the storage array.

3. Decrement the measured average response time (e.g., 0.5 msec) from the overall expected response time of the corresponding SLO (e.g., Silver SLO=2 msec) to obtain the amount of time a given IO operation may be queued in the host device (e.g., 2-0.5=1.5 msec) without impacting the expected response time.

4. Assign initial TTBU values of zero to any queued IO operations that need to be sent to the storage array immediately (e.g., IO operations corresponding to Diamond/Gold SLOs).

5. For all other queued IO operations, assign a non-zero initial TTBU value to each JO operation based on the amount of time it may be queued without impacting the expected response time. In the case of the particular example of step 3 above, the initial TTBU value assigned to the given IO operation is 1.5 msec.

6. Initiate time-based decrementing to continually or periodically adjust the non-zero initial TTBU values based on actual amounts of time spent by their respective IO operations in the IO queues.

7. Select IO operations from the IO queues in order of increasing TTBU values, such that IO operations having lower TTBU values after any adjustment are sent before those IO operations having higher TTBU values after any adjustment.

8. Hold in the IO queues any IO operations having TTBU values greater than a designated multiple of the average response time (e.g., 1.5 times the average response time) of its corresponding storage device as determined in step 2.

Although the example steps are listed serially above for clarity and simplicity of illustration, the process can be configured to implement multiple steps in parallel, and can return from a given step to an earlier step at one or more points in the process. For example, the reading of the assigned SLO information in step 1 and/or the determination of current latencies in step 2 can be repeated periodically or under other conditions. Also, steps such as steps 3 through 6 are repeated for any new IO operations that arrive in the IO queues of the host device. As mentioned previously, different instances of the process can be performed by different MPIO drivers in different host devices.

In this example process and possibly others described herein, IO operations from synchronous sources (e.g., Oracle Log IOs) having higher-performance SLOs specifying fast response times will be sent before IO operations from asynchronous sources (e.g., Oracle DB IOs) having lower-performance SLOs specifying slower response times, thereby achieving better overall performance for the application.

In some implementations of the process, average response time for a given logical storage device of the storage array may vary between multiple paths from the host device to the given logical storage device. Such implementations can be adapted in a straightforward manner to take the different average response times of the multiple paths into account in the SLO-based IO selection.

The impact of the process on utilization of host memory can be limited by specifying a maximum amount of host device memory that can be utilized for the IO queues and any associated processing overhead.

Again, it is to be appreciated that the particular SLO-based IO selection arrangements described above are presented by way of illustrative example only. Numerous alternative arrangements of these and other features can be used in implementing the FIG. 2 process and other illustrative embodiments.

The illustrative embodiments disclosed herein can provide a number of significant advantages relative to conventional arrangements.

For example, some embodiments provide SLO-based IO selection utilizing a multi-path layer of one or more host devices, operating in cooperation with a shared storage array or other type of storage system. The multi-path layer illustratively comprises at least one MPIO driver configured to process IO operations for delivery from a corresponding host device to the storage system. The MPIO driver reads SLO information from a storage array or other storage system and utilizes that information in selecting IO operations from host device IO queues for delivery to the storage system.

These and other embodiments overcome the problems that can otherwise result when storage systems alone attempt to achieve SLOs across multiple host devices that share that storage system.

For example, configuring an MPIO driver of a host device to interact with a storage array or other storage system in implementing SLO-based IO selection functionality can avoid or otherwise limit the situations in which the artificial delays are introduced in storage system queues, thereby reducing storage system queue congestion. As a result, the number of "queue full" messages received in the host devices from the storage system is reduced, and overall storage system performance is improved.

Illustrative embodiments therefore exhibit significant performance enhancements relative to conventional arrangements in which SLO-based IO selection is implemented solely in a storage array and may involve introduction of artificial delays for certain IO operations in order to achieve a corresponding SLO.

It is to be appreciated that the particular advantages described above are associated with particular illustrative embodiments and need not be present in other embodiments. Also, the particular types of information processing system features and functionality as illustrated in the drawings and described above are exemplary only, and numerous other arrangements may be used in other embodiments.

It was noted above that portions of an information processing system as disclosed herein may be implemented using one or more processing platforms. Illustrative embodiments of such platforms will now be described in greater detail. These and other processing platforms may be used to implement at least portions of other information processing systems in other embodiments of the invention. A given such processing platform comprises at least one processing device comprising a processor coupled to a memory.

One illustrative embodiment of a processing platform that may be used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as virtual machines, or portions thereof, are illustratively implemented for use by tenants of such a multi-tenant environment.

Cloud infrastructure as disclosed herein can include cloud-based systems such as Amazon Web Services, Google Cloud Platform and Microsoft Azure. Virtual machines provided in such systems can be used to implement a fast tier or other front-end tier of a multi-tier storage system in illustrative embodiments. A capacity tier or other back-end tier of such a multi-tier storage system can be implemented using one or more object stores such as Amazon S3, Google Cloud Platform Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of LXC. The containers may run on virtual machines in a multi-tenant environment, although other arrangements are possible. The containers may be utilized to implement a variety of different types of functionality within the system 100. For example, containers can be used to implement respective compute nodes or storage nodes of a cloud-based system. Again, containers may be used in combination with other virtualization infrastructure such as virtual machines implemented using a hypervisor.

Another illustrative embodiment of a processing platform that may be used to implement at least a portion of an information processing system comprises a plurality of processing devices which communicate with one another over at least one network. The network may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

Each processing device of the processing platform comprises a processor coupled to a memory. The processor may comprise a microprocessor, a microcontroller, an application-specific integrated circuit (ASIC), a field-programmable gate array (FPGA) or other type of processing circuitry, as well as portions or combinations of such circuitry elements. The memory may comprise random access memory (RAM), read-only memory (ROM), flash memory or other types of memory, in any combination. The memory and other memories disclosed herein should be viewed as illustrative examples of what are more generally referred to as "processor-readable storage media" storing executable program code of one or more software programs.

Articles of manufacture comprising such processor-readable storage media are considered embodiments of the present invention. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals.

Also included in the processing device is network interface circuitry, which is used to interface the processing device with the network and other system components, and may comprise conventional transceivers.

As another example, portions of a given processing platform in some embodiments can comprise converged infrastructure such as VxRail™, VxRack™, VxRack™ FLEX, VxBlock™, or Vblock® converged infrastructure from VCE, the Virtual Computing Environment Company, now the Converged Platform and Solutions Division of Dell EMC.

Again, these particular processing platforms are presented by way of example only, and other embodiments may include additional or alternative processing platforms, as well as numerous distinct processing platforms in any combination, with each such platform comprising one or more computers, servers, storage devices or other processing devices.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in an information processing system as disclosed herein. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality of host devices 102, SAN 104 and storage array 105 are illustratively implemented in the form of software running on one or more processing devices. As a more particular example, instances of SLO-based IO selection logic 114 may be implemented at least in part in software, as indicated previously herein.

It should again be emphasized that the above-described embodiments of the invention are presented for purposes of illustration only. Many variations and other alternative embodiments may be used. For example, the disclosed techniques are applicable to a wide variety of other types of information processing systems, utilizing other arrangements of host devices, networks, storage systems, storage arrays, storage devices, processors, memories, IO queues, MPIO drivers, IO selection logic and additional or alternative components. Also, the particular configurations of system and device elements and associated processing operations illustratively shown in the drawings can be varied in other embodiments. For example, a wide variety of different MPIO driver configurations and associated SLO-based IO selection arrangements can be used in other embodiments. Moreover, the various assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. An apparatus comprising:
    a host device configured to communicate over a network with a storage system;
    the host device comprising:
    a set of input-output queues; and
    a multi-path input-output driver configured to select input-output operations from the set of input-output queues for delivery to the storage system over the network;
    wherein the multi-path input-output driver is further configured:
    to determine service level objectives for respective sources of the input-output operations;
    to determine latencies of storage devices of the storage system;
    to assign an initial time-to-become-urgent value to each of at least a subset of the input-output operations based at least in part on the service level objective of the source of the input-output operation and one or more of the determined latencies;

to adjust at least a subset of the time-to-become-urgent values based at least in part on amounts of time spent by the corresponding input-output operations in the set of input-output queues; and to select input-output operations from the set of input-output queues for delivery to the storage system based at least in part on the respective time-to-become-urgent values as adjusted.

2. The apparatus of claim 1 further comprising one or more additional host devices each configured to communicate over the network with the storage system and wherein each additional host device comprises a set of input-output queues and a multi-path input-output driver configured to select input-output operations from the set of input-output queues for delivery to the storage system over the network.

3. The apparatus of claim 1 wherein the multi-path input-output driver of the host device is configured to determine the service level objectives for respective sources of the input-output operations based at least in part on corresponding service level objective information read by the multi-path input-output driver from the storage system.

4. The apparatus of claim 1 wherein the multi-path input-output driver of the host device in determining latencies of the storage devices is configured to determine a current latency for a given one of the storage devices based at least in part on an average response time of the given storage device to input-output operations delivered to the given storage device over a designated period of time.

5. The apparatus of claim 1 wherein the multi-path input-output driver of the host device is configured to compute initial time-to-become-urgent values for assignment to respective ones of the input-output operations by decrementing an average response time from an expected response time of a service level objective of the source of each input-output operation to obtain as the time-to-become-urgent value for that input-output operation an amount of time that the input-output operation can remain in the set of input-output queues without adversely impacting expected response time of the input-output operation.

6. The apparatus of claim 1 wherein the multi-path input-output driver of the host device is configured to adjust at least a subset of the time-to-become-urgent values based at least in part on amounts of time spent by the corresponding input-output operations in the set of input-output queues by periodically decrementing each of the time-to-become-urgent values in accordance with an elapsed time spent by that input-output operation in the set of input-output queues since assignment of the initial time-to-become-urgent value to the input-output operation.

7. The apparatus of claim 1 wherein the multi-path input-output driver of the host device is configured to select input-output operations from the set of input-output queues for delivery to the storage system in order of increasing time-to-become-urgent values such that input-output operations having smaller time-to-become-urgent values are selected before other input-output operations having larger time-to-become-urgent values.

8. The apparatus of claim 1 wherein the multi-path input-output driver of the host device is configured to assign initial time-to-become-urgent values of zero to respective ones of the input-output operations having a highest priority level so as to ensure that any such input-output operations are selected for delivery to the storage system prior to other input-output operations having non-zero time-to-become-urgent values.

9. The apparatus of claim 1 wherein the multi-path input-output driver of the host device is configured to hold in the set of input-output queues one or more input-output operations having time-to-become-urgent values that are greater than a threshold multiple of an average response time of a corresponding one of the storage devices.

10. The apparatus of claim 9 wherein the threshold multiple is about 1.5 times the average response time of the corresponding one of the storage devices.

11. The apparatus of claim 1 wherein the sources of the input-output operations include respective processes of one or more applications executing on the host device.

12. The apparatus of claim 11 wherein the processes comprise respective synchronous and asynchronous processes of an application and wherein input-output operations generated by the synchronous process of the application are assigned lower initial time-to-become-urgent values by the multi-path input-output driver than input-output operations generated by the asynchronous process of the application.

13. The apparatus of claim 11 wherein the processes comprise respective log and database processes of a database application and wherein input-output operations generated by the log process of the database application are assigned lower initial time-to-become-urgent values by the multi-path input-output driver than input-output operations generated by the database process of the database application.

14. The apparatus of claim 1 wherein the multi-path input-output driver of the host device is configured to select one of a plurality of available paths for delivery of selected input-output operations to a given one of the storage devices based at least in part on average response times of respective ones of the paths to the given storage device and the time-to-become-urgent values.

15. A method comprising:
configuring a multi-path input-output driver of a host device to select input-output operations from a set of input-output queues of the host device for delivery to a storage system over a network;
wherein the multi-path input-output driver in conjunction with selecting the input-output operations performs the following steps:
determining service level objectives for respective sources of the input-output operations;
determining latencies of storage devices of the storage system;
assigning an initial time-to-become-urgent value to each of at least a subset of the input-output operations based at least in part on the service level objective of the source of the input-output operation and one or more of the determined latencies;
adjusting at least a subset of the time-to-become-urgent values based at least in part on amounts of time spent by the corresponding input-output operations in the set of input-output queues; and
selecting input-output operations from the set of input-output queues for delivery to the storage system based at least in part on the respective time-to-become-urgent values as adjusted.

16. The method of claim 15 wherein the multi-path input-output driver of the host device is configured to determine the service level objectives for respective sources of the input-output operations based at least in part on corresponding service level objective information read by the multi-path input-output driver from the storage system.

17. The method of claim 15 wherein the multi-path input-output driver of the host device in determining latencies of the storage devices is configured to determine a current latency for a given one of the storage devices based at least in part on an average response time of the given storage device to input-output operations delivered to the given storage device over a designated period of time.

18. A computer program product comprising a non-transitory processor-readable storage medium having stored therein program code of one or more software programs, wherein the program code, when executed by a host device comprising a multi-path input-output driver and a set of input-output queues, the host device being configured to communicate over a network with a storage system, causes the multi-path input-output driver:

to determine service level objectives for respective sources of input-output operations;

to determine latencies of storage devices of the storage system;

to assign an initial time-to-become-urgent value to each of at least a subset of the input-output operations based at least in part on the service level objective of the source of the input-output operation and one or more of the determined latencies;

to adjust at least a subset of the time-to-become-urgent values based at least in part on amounts of time spent by the corresponding input-output operations in the set of input-output queues; and to select input-output operations from the set of input-output queues for delivery to the storage system based at least in part on the respective time-to-become-urgent values as adjusted.

19. The computer program product of claim 18 wherein the multi-path input-output driver of the host device is configured to determine the service level objectives for respective sources of the input-output operations based at least in part on corresponding service level objective information read by the multi-path input-output driver from the storage system.

20. The computer program product of claim 18 wherein the multi-path input-output driver of the host device in determining latencies of the storage devices is configured to determine a current latency for a given one of the storage devices based at least in part on an average response time of the given storage device to input-output operations delivered to the given storage device over a designated period of time.

* * * * *

UNITED STATES PATENT AND TRADEMARK OFFICE
CERTIFICATE OF CORRECTION

PATENT NO. : 10,757,189 B2
APPLICATION NO. : 15/966112
DATED : August 25, 2020
INVENTOR(S) : Sanjib Mallick et al.

Page 1 of 1

It is certified that error appears in the above-identified patent and that said Letters Patent is hereby corrected as shown below:

In the Title:
In item (54), Please delete "OBJECTION" and insert therefor --OBJECTIVE--

Signed and Sealed this
Twenty-second Day of September, 2020

Andrei Iancu
*Director of the United States Patent and Trademark Office*